(12) United States Patent
Tokumoto

(10) Patent No.: US 9,465,605 B2
(45) Date of Patent: Oct. 11, 2016

(54) IMAGE FORMING APPARATUS THAT PERFORMS UPDATING OF FIRMWARE, CONTROL METHOD THEREFOR, AND STORAGE MEDIUM

(71) Applicant: CANON KABUSHIKI KAISHA, Tokyo (JP)

(72) Inventor: Yoko Tokumoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/540,532

(22) Filed: Nov. 13, 2014

(65) Prior Publication Data

US 2015/0143352 A1 May 21, 2015

(30) Foreign Application Priority Data

Nov. 15, 2013 (JP) ................................. 2013-236928

(51) Int. Cl.
*G06F 9/44* (2006.01)
*G06F 9/445* (2006.01)
*G06F 21/00* (2013.01)

(52) U.S. Cl.
CPC . *G06F 8/68* (2013.01); *G06F 8/65* (2013.01); *G06F 21/00* (2013.01)

(58) Field of Classification Search
CPC ............. G06F 8/68; G06F 8/65; G06F 21/00
USPC ........................................................ 717/169
See application file for complete search history.

(56) References Cited

U.S. PATENT DOCUMENTS

| 8,612,742 B2 | 12/2013 | Hirabayashi | |
|---|---|---|---|
| 2012/0173867 A1* | 7/2012 | Hirabayashi | 713/150 |
| 2013/0247228 A1* | 9/2013 | Wang | G06F 21/10 726/29 |
| 2013/0332747 A1* | 12/2013 | Roberts | G06F 21/602 713/192 |
| 2014/0208114 A1* | 7/2014 | Sopco et al. | 713/171 |

FOREIGN PATENT DOCUMENTS

JP 2011-100328 A 5/2011

\* cited by examiner

*Primary Examiner* — Anna Deng
(74) *Attorney, Agent, or Firm* — Rossi, Kimms & McDowell LLP

(57) ABSTRACT

An image forming apparatus having a firmware update technology that realizes updating of firmware using an encrypted file and reduces a downtime using a differential update. When a first update instruction to perform an update using a first firmware including an encrypted plurality of files is accepted, a content list file is downloaded from an external apparatus, an update file to be updated is identified based on the content list file, and the identified update file is further downloaded from the external apparatus. Then, the update file is decrypted and installed in the image forming apparatus. When a second update instruction to perform an update using a second firmware including an encrypted plurality of files and content list files is accepted, the second firmware is downloaded in a single batch from the external apparatus. Then, the second firmware is decrypted, and the plurality of files is installed in the image forming apparatus.

9 Claims, 6 Drawing Sheets

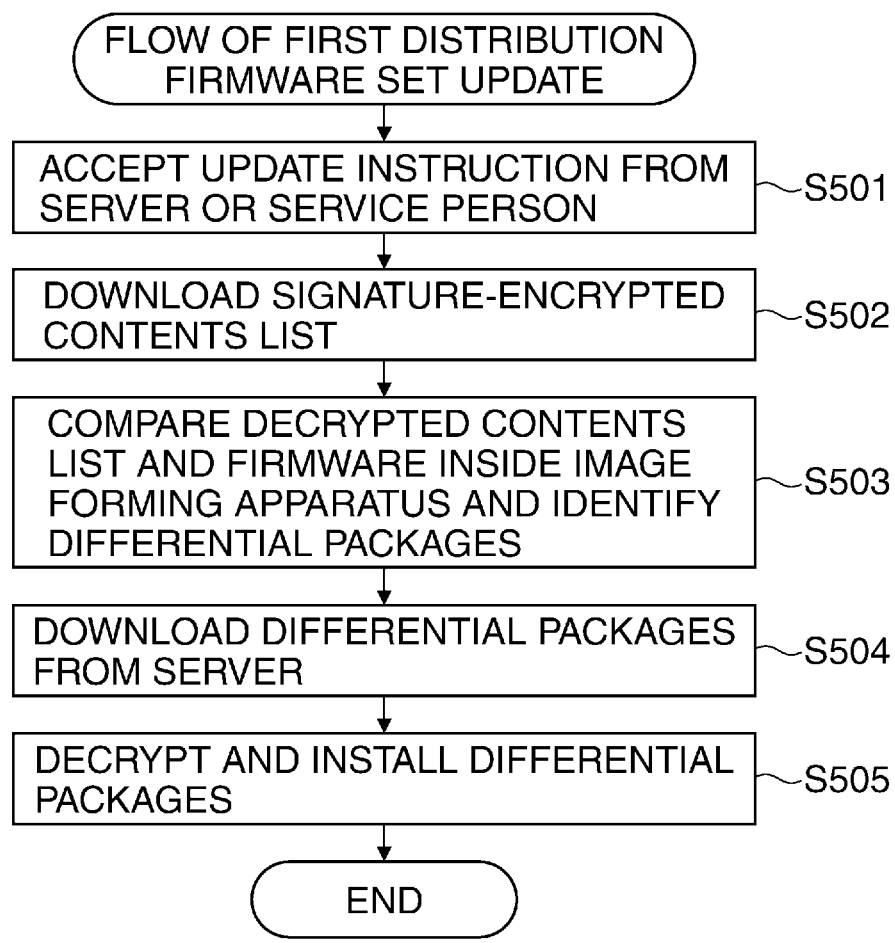

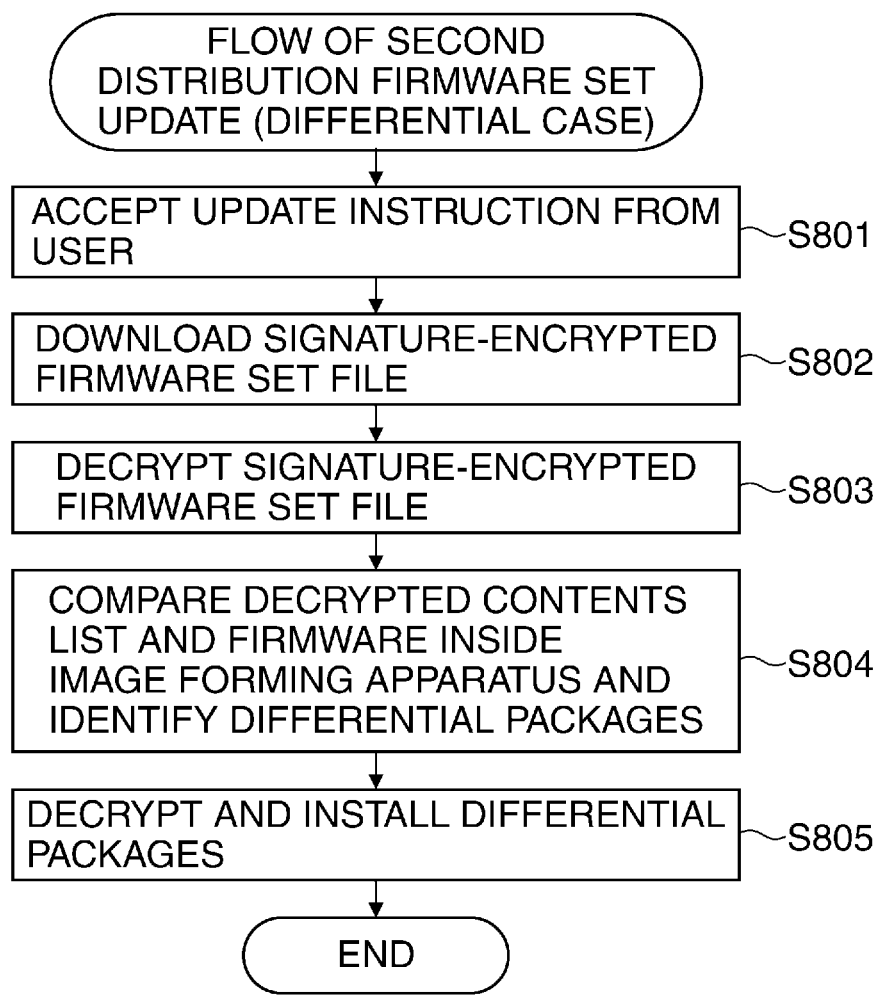

IMAGE FORMING APPARATUS THAT PERFORMS UPDATING OF FIRMWARE, CONTROL METHOD THEREFOR, AND STORAGE MEDIUM

BACKGROUND OF THE INVENTION

1. Field of the Invention

The present invention relates to an image forming apparatus, a control method therefor, and a storage medium, and more particularly to a method of updating firmware of a digital multifunction machine or the like by means of an encrypted file.

2. Description of the Related Art

Updating of firmware of a digital multifunction machine or the like is frequently performed for the purpose of fixing defects or adding functions after the machine is released to a market. When delivering a file for updating firmware to a digital multifunction machine via a network, signature encryption is performed with respect to the file to be delivered, so that the firmware is not tampered with and fraudulent updating is not performed.

Further, from the user's viewpoint the time required for updating the firmware constitutes downtime of the relevant device, and it is thus desirable to shorten the updating time as much as possible to reduce the downtime. Therefore, a differential update is performed in which the firmware is divided into a plurality of package files, differential package files are identified in advance, and only the required package files are downloaded and updated.

In a case of a differential update, signature encryption is performed with respect to each package file constituting the firmware. Since the entire firmware is constituted by a combination of respective package files, it is necessary to ensure that the information regarding the combination of package files is not itself tampered with. For example, there has been proposed a method for ensuring that downloading or updating of a program that was tampered with is not performed in which hash values of respective files that constitute a program to be updated are calculated to create a table, and the table is encrypted (see Japanese Laid-Open Patent Publication (Kokai) No. 2011-100328).

On the other hand, with respect to updating firmware, a method is available in which a firmware delivery server provided by a manufacturer is used to deliver firmware via a network to users that have entered a firmware delivery contract. Further, with respect to users that have not entered a firmware delivery contract, by making firmware that can be used for updating publicly available on a website provided by a manufacturer, the users themselves can carry out a firmware update.

In a case where a user has entered a firmware delivery contract with a manufacturer, fundamentally, a situation does not arise in which the user directly handles file information (information relating to a combination of package files or the like) of the firmware that is delivered.

However, in a case where firmware that can be used for updating is made publicly available on a website provided by a manufacturer, a general user downloads the firmware onto their PC and directly performs operations with respect to the firmware. Therefore, a case arises in which a user directly handles file information of the firmware.

To prevent tampering with respect to firmware that is delivered or downloaded, although it is conceivable to encrypt the entire firmware that is constituted by a plurality of packages, if the entire firmware is encrypted, a differential update cannot be performed and there is a concern that the updating time will increase. In order to perform a differential update, it is necessary to enable delivery of firmware in package units.

In a case where a user enters a firmware delivery contract with a manufacturer, and firmware is delivered directly from a firmware delivery server provided by the manufacturer, since opportunities for tampering with the firmware are reduced, it is possible to distribute the firmware in package units.

However, in a case where firmware is made publicly available to general users, in order to prevent tampering with respect to the combination of package files, distribution of firmware in package units cannot be performed.

SUMMARY OF THE INVENTION

The present invention provides an image forming apparatus having a firmware update technology that, while realizing the updating of firmware by means of an encrypted file, enables a reduction in the downtime of a device by means of a differential update, as well as a control method for the image forming apparatus and a storage medium.

Accordingly, a first aspect of the present invention provides an image forming apparatus that performs an update of a firmware comprising a plurality of update files and a content list file that shows a combination of the plurality of files, the image forming apparatus comprising a first acceptance unit configured to accept a first update instruction to perform an update of a first firmware in which the plurality of files are respectively encrypted, a first installation unit configured to, in a case where the first update instruction is accepted by the first acceptance unit, download the content list file from an external apparatus, identify an update file as an object of an update on a basis of the content list file, download the identified update file from the external apparatus and decrypt the update file, and install the update file in the image forming apparatus, a second acceptance unit configured to accept a second update instruction to perform an update of a second firmware in which the plurality of update files and the content list file are put together in a single file and encrypted, and a second installation unit configured to, in a case where the second update instruction is accepted by the second acceptance unit, download the second firmware in a single batch from the external apparatus and decrypt the second firmware, and install a plurality of files included in the decrypted second firmware in the image forming apparatus.

Accordingly, a second aspect of the present invention provides an image forming apparatus that performs an update of a firmware comprising a plurality of update files and a content list file that shows a combination of the plurality of files, the image forming apparatus comprising a first acceptance unit configured to accept a first update instruction to perform an update of a first firmware in which the plurality of files are respectively encrypted, a first installation unit configured to, in a case where the first update instruction is accepted by the first acceptance unit, download the content list file from an external apparatus, identify an update file as an object of an update on a basis of the content list file, download the identified update file from the external apparatus and decrypt the update file, and install the update file in the image forming apparatus, a second acceptance unit configured to accept a second update instruction to perform an update of a second firmware in which the plurality of update files and the content list file are put together in a single file and encrypted, and a second installation unit configured to, in a case where the second update instruction is accepted by the second acceptance unit, download the second firmware in a single batch from the external apparatus and decrypt the second firmware, identify a update file as an object of an update on a basis of the content list file included in the second firmware that is decrypted, and install only the update file in the image forming apparatus.

Accordingly, a third aspect of the present invention provides a control method for an image forming apparatus that performs an update of a firmware comprising a plurality of files and a content list file that shows a combination of the plurality of files, the control method comprising a first acceptance step of accepting a first update instruction to perform an update of a first firmware in which the plurality of update files are respectively encrypted, a first installation step of, in a case where the first update instruction is accepted in the first acceptance step, downloading the content list file from an external apparatus, identifying an update file as an object of an update on a basis of the content list file, downloading the identified update file from the external apparatus and decrypting the update file, and installing the update file in the image forming apparatus, a second acceptance step of accepting a second update instruction to perform an update of a second firmware in which the plurality of update files and the content list file are put together in a single file and encrypted, and a second installation step of, in a case where the second update instruction is accepted in the second acceptance step, downloading the second firmware in a single batch from the external apparatus and decrypting the second firmware, and installing a plurality of files included in the decrypted second firmware in the image forming apparatus.

Accordingly, a fourth aspect of the present invention provides a control method for an image forming apparatus that performs an update of a firmware comprising a plurality of update files and a content list file that shows a combination of the plurality of files, the control method comprising a first acceptance step of accepting a first update instruction to perform an update of a first firmware in which the plurality of files are respectively encrypted, a first installation step of, in a case where the first update instruction is accepted in the first acceptance step, downloading the content list file from an external apparatus, identifying an update file as an object of an update on a basis of the content list file, downloading the identified update file from the external apparatus and decrypting the update file, and installing the update file in the image forming apparatus, a second acceptance step of accepting a second update instruction to perform an update of a second firmware in which the plurality of update files and the content list file are put together in a single file and encrypted, and a second installation step of, in a case where the second update instruction is accepted in the second acceptance step, downloading the second firmware in a single batch from the external apparatus and decrypting the second firmware, identifying a update file as an object of an update on a basis of the content list file included in the second firmware that is decrypted, and installing only the update file in the image forming apparatus.

Accordingly, a fifth aspect of the present invention provides a computer-readable, non-transitory storage medium storing a program for causing a computer of an image forming apparatus to implement a control method for the image forming apparatus, the image forming apparatus being that performs an update of a firmware comprising a plurality of update files and a content list file that shows a combination of the plurality of files, the control method comprising a first acceptance step of accepting a first update instruction to perform an update of a first firmware in which the plurality of files are respectively encrypted, a first installation step of, in a case where the first update instruction is accepted in the first acceptance step, downloading the content list file from an external apparatus, identifying an update file as an object of an update on a basis of the content list file, downloading the identified update file from the external apparatus and decrypting the update file, and installing the update file in the image forming apparatus, a second acceptance step of accepting a second update instruction to perform an update of a second firmware in which the plurality of update files and the content list file are put together in a single file and encrypted, and a second installation step of, in a case where the second update instruction is accepted in the second acceptance step, downloading the second firmware in a single batch from the external apparatus and decrypting the second firmware, and installing a plurality of files included in the decrypted second firmware in the image forming apparatus.

Accordingly, a sixth aspect of the present invention provides a computer-readable, non-transitory storage medium storing a program for causing a computer of an image forming apparatus to implement a control method for the image forming apparatus, the image forming apparatus being configured to perform an update of a firmware comprising a plurality of update files and a content list file that shows a combination of the plurality of files, the control method comprising a first acceptance step of accepting a first update instruction to perform an update of a first firmware in which the plurality of files are respectively encrypted, a first installation step of, in a case where the first update instruction is accepted in the first acceptance step, downloading the content list file from an external apparatus, identifying an update file as an object of an update on a basis of the content list file, downloading the identified update file from the external apparatus and decrypting the update file, and installing the update file in the image forming apparatus, a second acceptance step of accepting a second update instruction to perform an update of a second firmware in which the plurality of update files and the content list file are put together in a single file and encrypted, and a second installation step of, in a case where the second update instruction is accepted in the second acceptance step, downloading the second firmware in a single batch from the external apparatus and decrypting the second firmware, identifying an update file as an object of an update on a basis of the content list file included in the second firmware that is decrypted, and installing only the update file in the image forming apparatus.

According to the present invention, in a case where there is an instruction from a specified user, downloading, decryption and installation of only a differential file is performed, and in a case where there is an update instruction from an unspecified general user, downloading, decryption and installation of a second distribution firmware that is entirely encrypted is performed. It is thereby possible to reduce the downtime of a device by using a differential update, while realizing a firmware update by means of an encrypted file.

Further features of the present invention will become apparent from the following description of exemplary embodiments (with reference to the attached drawings).

BRIEF DESCRIPTION OF THE DRAWINGS

FIG. 4A to FIG. 4C are views showing examples of contents of a signature-encrypted contents list file shown in FIG. 3, in which FIG. 4A shows a contents list that shows packages prior to an update that are installed in the image forming apparatus, FIG. 4B shows a contents list that shows packages after the update, and FIG. 4C shows packages that correspond to a difference between a contents list 401 and a contents list 402.

FIG. 5 is a flowchart showing a flow of processing for updating by means of the first distribution firmware set shown in FIG. 3.

FIG. 8 is a flowchart showing a flow of partial differential update processing by means of the second distribution firmware set.

DESCRIPTION OF THE EMBODIMENTS

An embodiment of the present invention is described in detail hereunder with reference to the attached drawings.

Figure 1:
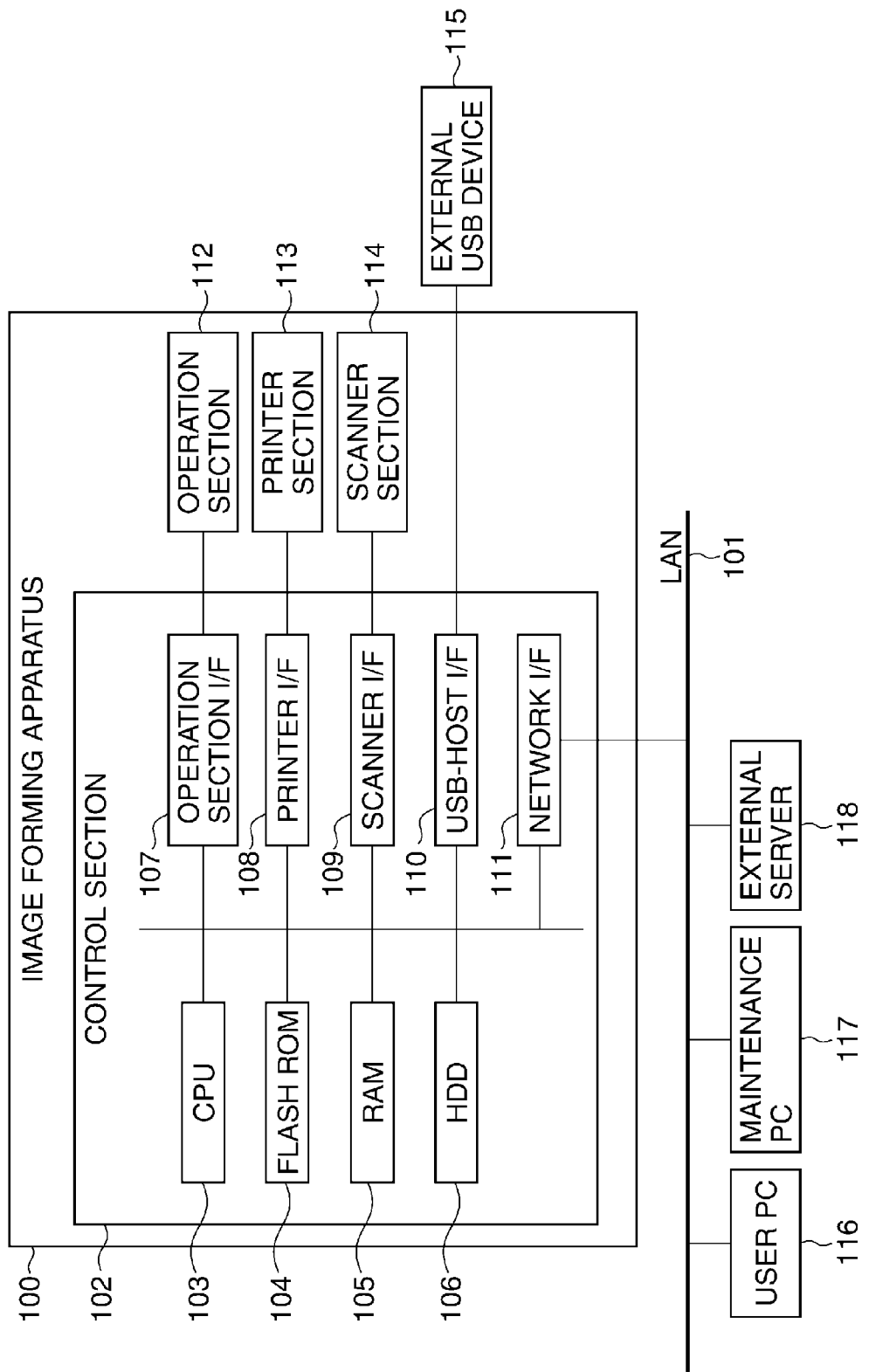
FIG. 1 is a block diagram showing a schematic configuration of an image forming apparatus according to an embodiment of the present invention.

FIG. 1 is a block diagram showing a schematic configuration of an image forming apparatus according to an embodiment of the present invention.

In FIG. 1, a control section 102 includes components described hereunder as a configuration for controlling the overall operations of an image forming apparatus 100.

A CPU 103 reads out a program (firmware) stored in a Flash ROM 104 to a RAM 105, and executes various kinds of control processing such as reading control, printing control, and firmware update control. The Flash ROM 104 is a memory that can also be used as a file storage area for updating firmware, a work area or a user data area.

The RAM 105 is a memory that is used as a temporary storage area such as the main memory of the CPU 103 or a work area. A HDD 106 is a memory that stores image data or user data or the like. It should be noted that the HDD 106 may be a SSD (solid state drive). A configuration may also be adopted in which the control section 102 has a plurality of CPUs.

An operation section I/F 107 is an interface that connects an operation section 112 and the control section 102. The operation section 112 includes an unshown liquid crystal display section that has a touch panel function, or a keyboard or the like.

A printer I/F 108 is an interface that connects a printer section 113 and the control section 102. Image data to be printed by the printer section 113 is transferred to the printer section 113 from the control section 102 through the printer I/F 108, and is printed on a recording medium at the printer section 113.

A scanner I/F 109 is an interface that connects a scanner section 114 and the control section 102. The scanner section 114 reads an image on an original and generates image data, and transfers the generated image data to the HDD 106 through the scanner I/F 109.

A USB-Host I/F 110 is an interface that connects with an external USB device 115. A USB memory or a USB keyboard or the like may be mentioned as examples of the external USB device 115.

A network I/F 111 is a network interface for connecting to a LAN 101. The network I/F 111 sends image data or information to an external apparatus (for example, a user PC 116, a maintenance PC 117, or an external server 118) on the LAN 101 and, conversely, receives firmware for updating and various kinds of information. It should be noted that a configuration may also be adopted in which the external server 118 is present on the Internet, and is not present on the LAN 101.

Next, the configuration of firmware that is executed by the CPU 103 of the control section 102 will be described using FIG. 2.

Figure 2:
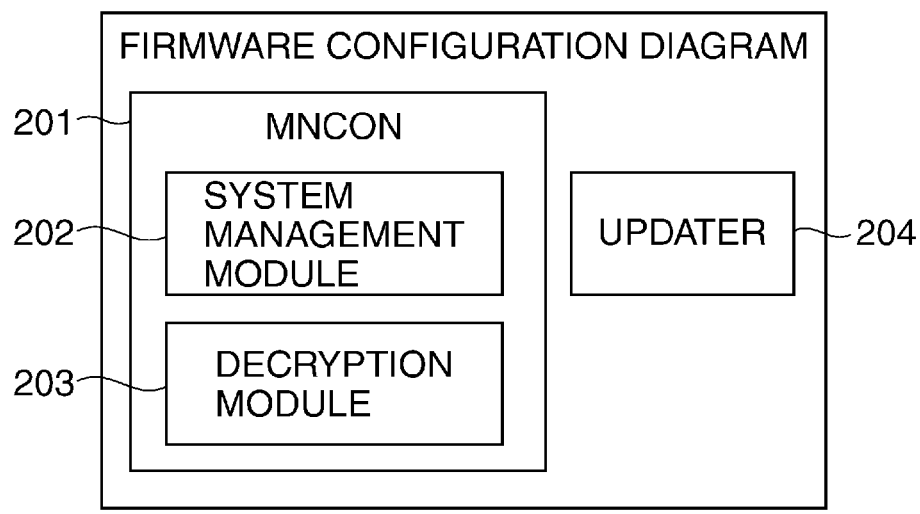
FIG. 2 is a view showing a configuration example of firmware of the image forming apparatus.

FIG. 2 is a view that shows a configuration example of firmware of the image forming apparatus 100.

In the present embodiment, it is assumed that the firmware shown in FIG. 2 is stored in the Flash ROM 104 of the image forming apparatus 100.

An MNCON 201 indicates an overall module group that performs overall control of the apparatus, such as functional modules for printing and scanning or the like that a user normally uses. A system management module 202 and a decryption module 203 that decrypts a signature-encrypted file are included in the MNCON 201. A user can operate the image forming apparatus 100, refer to setting values, and send firmware that is an update object or the like by means of the system management module 202. An Updater 204 is a module that performs updating of the MNCON 201.

It should be noted that the program modules shown in FIG. 2 are merely one example of program modules, and program modules that are different to the program modules shown in FIG. 2 may also be included.

Next, processing to update firmware in the image forming apparatus 100 will be described. It is possible to update the firmware in the image forming apparatus 100 by means of two kinds of distribution firmware. First, update processing by means of a first distribution firmware will be described.

Figure 3:
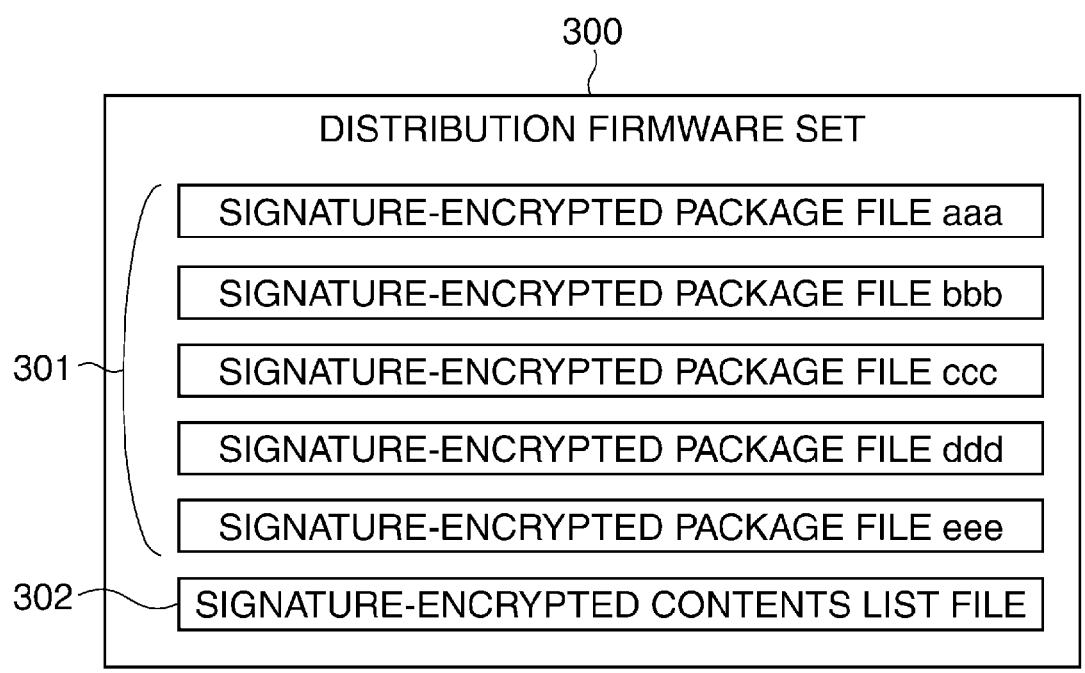
FIG. 3 is a view showing one example of a first distribution firmware set that is distributed to the image forming apparatus.

FIG. 3 is a view that shows an example of a first distribution firmware set 300 that is distributed to the image forming apparatus 100.

The firmware of the image forming apparatus is constituted by a plurality of package files and one contents list file. The contents list file is a settings file that shows a combination of a plurality of package files, and version information of each package file is included therein. When a package file is installed in the image forming apparatus 100, the package file functions as a predetermined functional module.

In FIG. 3, the distribution firmware set 300 is constituted by a signature-encrypted package file group 301 in which the individual packages are signature-encrypted, and a signature-encrypted contents list file 302 in which a list of all the packages is signature-encrypted. Each signature-encrypted package file of the signature-encrypted package file group 301 is decrypted by the decryption module 203 at the time of update processing, and is stored in an expanded state in the Flash ROM 104. Updating of firmware in the present embodiment is based on performing the update in accordance with the signature-encrypted contents list file 302. This is to maintain the combination of packages for which the quality is assured. Further, the distribution firmware set 300 is managed by the external server 118.

Figure 4A:
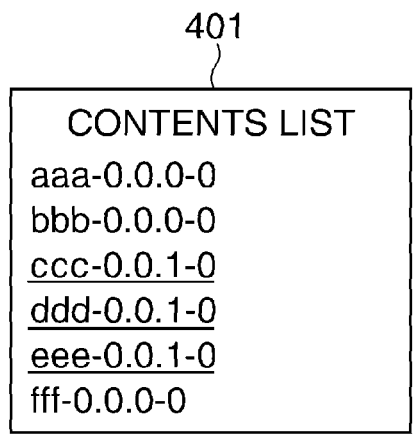
Figure 4B:
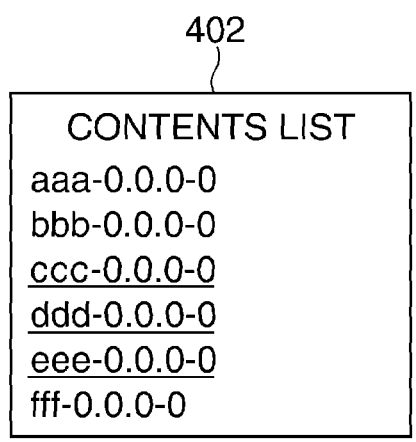
Figure 4C:
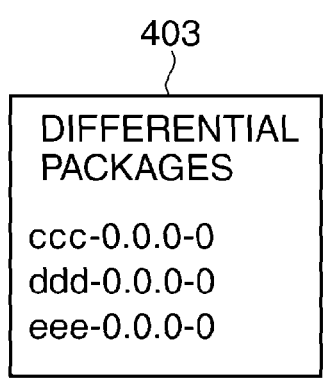

FIG. 4A to FIG. 4C are views that show examples of contents of the signature-encrypted contents list file 302 shown in FIG. 3.

A contents list 401 shown in FIG. 4A is a contents list that shows packages prior to an update that are installed in the image forming apparatus 100. A contents list 402 shown in FIG. 4B is a contents list that shows packages after the update. Differential packages 403 shown in FIG. 4C is a differential file that corresponds to a difference between the contents list 401 and the contents list 402. In the examples shown in FIG. 4A to FIG. 4C, because the respective version information for the package files ccc, ddd and eee differ between the contents list 401 and the contents list 402, these package files are differential packages.

The update by means of the first distribution firmware is carried out by identifying the differential packages by the above described method, and installing those differential packages.

A service person of a manufacturer that performs maintenance of the image forming apparatus 100 downloads the distribution firmware set 300 for updating from the external server 118 to the external USB device 115 or the maintenance PC 117. The service person can perform updating of the firmware by connecting the external USB device 115 or the maintenance PC 117 onto which the distribution firmware set 300 for updating was downloaded to the image forming apparatus 100.

Next, the flow of update processing by means of the first distribution firmware set shown in FIG. 3 will be described referring to FIG. 5.

FIG. 5 is a flowchart that shows the flow of update processing by means of the first distribution firmware set shown in FIG. 3. It should be noted that the processing shown in FIG. 5 is realized by the CPU 103 executing a program stored in the Flash ROM 104.

In step S501, the CPU 103 accepts an instruction to update the firmware from a service person through the operation section 112 by means of the system management module 202, or accepts an instruction to update the firmware from the external server 118. At this time, the CPU 103 notifies the update instruction to the Updater 204 via the system management module 202. It should be noted that although, for example, ID authentication or the like is used to determine whether or not the update instruction is from a service person, the present embodiment is not limited to a determination that is based on ID authentication.

Next, in step S502, the CPU 103 downloads the signature-encrypted contents list file 302 from the external server 118.

Next, in step S503, the CPU 103 decrypts the downloaded signature-encrypted contents list file 302 by means of the decryption module 203. The CPU 103 then compares the decrypted contents list and the firmware inside the image forming apparatus 100 and identifies differential packages that are packages for which updating is required. It should be noted that a configuration may also be adopted in which the decrypted contents list and a contents list inside the image forming apparatus 100 are compared to identify differential packages. Further, it is needless to say that combination information and version information of package files constituting the firmware are included in the objects for comparison.

Next, in step S504, the CPU 103 downloads the differential packages identified in step S503 from the external server 118. Subsequently, in step S505, the CPU 103 decrypts the downloaded differential packages by means of the decryption module 203, installs the decrypted differential packages by means of the Updater 204, and ends the update processing.

It should be noted that although a case of downloading the signature-encrypted contents list file 302 and the differential packages from the external server 118 has been described with respect to the above described processing, a configuration may also be adopted in which the signature-encrypted contents list file 302 and the differential packages are downloaded from the external USB device 115 or the maintenance PC 117.

Next, update processing by means of a second distribution firmware will be described.

Figure 6:
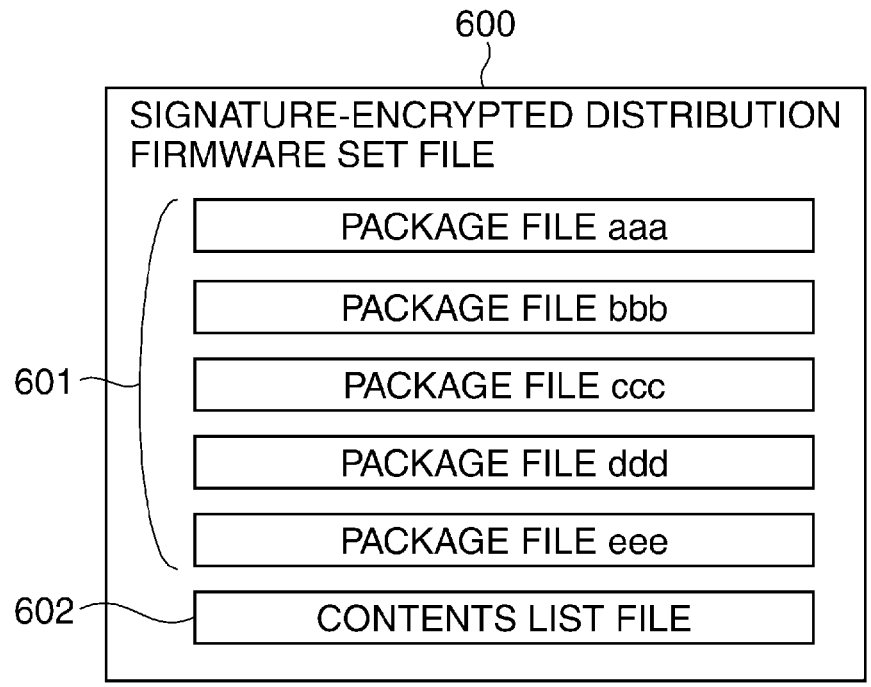
FIG. 6 is a view showing one example of a second distribution firmware set that is distributed to the image forming apparatus.

FIG. 6 is a view that shows one example of the second distribution firmware set that is distributed to the image forming apparatus 100.

In FIG. 6, a signature-encrypted distribution firmware set file 600 is constituted by a package file group 601, and a contents list file 602 in which all the packages are listed. The package file group 601 and the contents list file 602 need not be signature-encrypted as the signature-encrypted package file group 301 and the signature-encrypted contents list file 302 shown in FIG. 3. On the other hand, the entire signature-encrypted distribution firmware set file 600 is signature-encrypted and is a single firmware set file, and differs in this respect from the distribution firmware set shown in FIG. 3.

It is assumed that the signature-encrypted distribution firmware set file 600 is made publicly available on a website of the manufacturer or the like, and is provided in a format such that an unspecified large number of users can freely download the file onto their own respective PCs. Consequently, to ensure that a malicious user does not tamper with the firmware set and carry out fraudulent updating, it is necessary to subject the entire distribution firmware set to signature-encryption.

Next, the flow of update processing by means of the second distribution firmware set shown in FIG. 6 will be described referring to FIG. 7.

Figure 7:
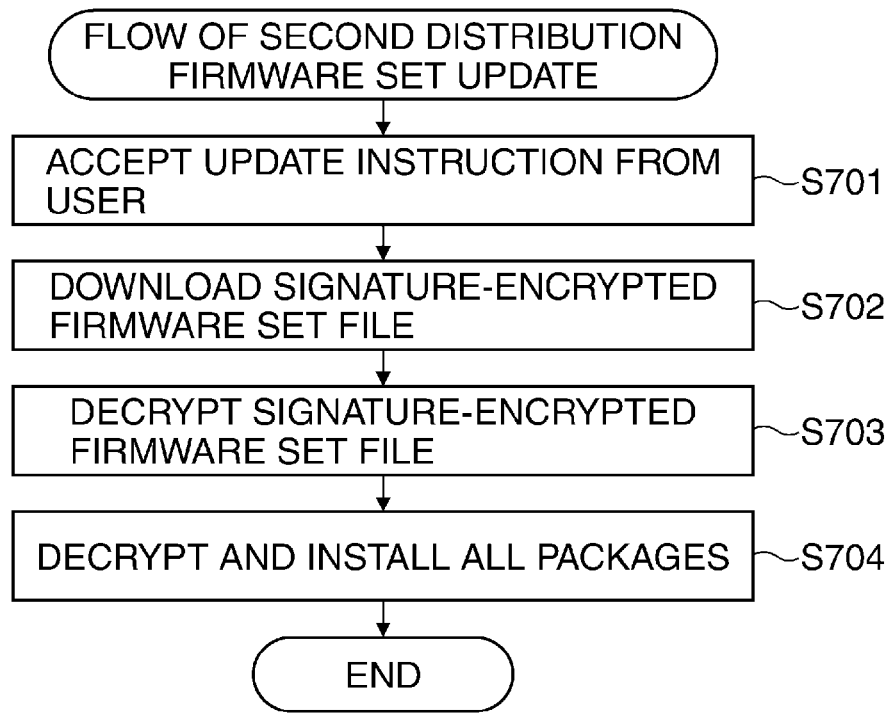
FIG. 7 is a flowchart showing a flow of processing for updating by means of the second distribution firmware set shown in FIG. 6.

FIG. 7 is a flowchart that shows the flow of update processing by means of the second distribution firmware set shown in FIG. 6. It should be noted that the processing shown in FIG. 7 is realized by the CPU 103 executing a program stored in the Flash ROM 104.

In step S701, the CPU 103 accepts an instruction to update the firmware from a user through the operation section 112 by means of the system management module 202. At this time, the CPU 103 notifies the update instruction to the Updater 204 via the system management module 202.

Next, in step S702, the CPU 103 downloads the signature-encrypted distribution firmware set file 600 in a single batch from the external USB device 115 or the maintenance PC 117 or the like. Thereafter, in step S703, the CPU 103 decrypts the downloaded signature-encrypted distribution firmware set file 600 by means of the decryption module 203.

Next, in step S704, the CPU 103 uses the decryption module 203 to decrypt all the packages of the package file group 601 included in the signature-encrypted distribution firmware set file 600 that was decrypted. Thereafter, installation of all the packages is performed by the Updater 204, and the update processing ends.

It should be noted that although a configuration in which the signature-encrypted distribution firmware set file 600 is downloaded from the external USB device 115 or the maintenance PC 117 has been described with respect to the above described processing, a configuration may also be adopted in which the signature-encrypted distribution firmware set file 600 is downloaded directly from the external server 118.

According to the update processing by means of the first distribution firmware set shown in FIG. 3, since it is possible to download, decrypt and install only differential packages, the updating time can be shortened. Further, an update instruction may be made by a user that has entered a contract for delivery of firmware by means of a server provided by a manufacturer, or by a service person employed by the manufacturer. It is thus possible to reduce the downtime of a device by performing a differential update, while also realizing a firmware update by means of encrypted files.

According to the update processing by means of the second distribution firmware shown in FIG. 6, because the entire distribution firmware set is signature-encrypted, a general user or the like cannot easily tamper with the firmware and thus the security can be strengthened.

According to a second embodiment of the present invention, a flow of partial differential update processing by means of the second distribution firmware set shown in FIG. 6 will be described by referring to FIG. 8. It should be noted that portions that are the same as those in the above described first embodiment are denoted by the same reference numerals, and a description of such portions is omitted. Hereunder, only differences with respect to the above described first embodiment are described.

FIG. 8 is a flowchart showing a flow of partial differential update processing by means of the second distribution firmware. It should be noted that the processing shown in FIG. 8 is realized by the CPU 103 executing a program stored in the Flash ROM 104.

In FIG. 8, the processing from step S801 to step S803 is the same as the processing from step S701 to step S703 in FIG. 7, and hence a description of those steps is omitted here.

In step S804, the CPU 103 compares the contents list file 602 included in the signature-encrypted distribution firmware set file 600 that was decrypted and the firmware inside the image forming apparatus, and identifies differential packages with respect to which updating is to be performed. It should be noted that a configuration may also be adopted in which the decrypted contents list and a contents list inside the image forming apparatus are compared to identify differential packages. Further, it is needless to say that combination information and version information of package files constituting the firmware are included in the objects for comparison.

Next, in step S805, the CPU 103 uses the decryption module 203 to decrypt only the differential packages identified in step S804, installs the differential packages by means of the Updater 204, and ends the update processing.

According to the above described processing, even in the case of the update processing by means of the second distribution firmware shown in FIG. 6, it is possible to install only differential packages and to thereby reduce the updating time.

Although the first and second embodiments describe a case in which the present invention is applied to an image forming apparatus, the present invention is not limited thereto. For example, it is possible to apply the present invention to an information processing apparatus such as a personal computer, or to a mobile terminal, a smartphone, a facsimile machine, an image pickup apparatus, a medical instrument or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-236928, filed Nov. 15, 2013, which is hereby incorporated by reference herein in its entirety.

What is claimed is:

1. An image forming apparatus that performs an update of a firmware comprising a plurality of update files and a content list file that shows a combination of the plurality of files, the image forming apparatus comprising:
   a memory device;
   a processor;
   a first acceptance unit configured to accept a first update instruction to perform an update of a first firmware in which the plurality of files are respectively encrypted;
   a first installation unit configured to, upon condition that the first update instruction is accepted by said first acceptance unit, download the content list file from an external apparatus, identify at least one difference update file to be installed in the image forming apparatus by comparing a list of files in the content list file and a list of files in the image forming apparatus, download the identified difference update file from the external apparatus and decrypt the difference update file, and install the difference update file in the image forming apparatus, wherein the difference update file includes at least one package file including at least one file, the package file does not include all files in the content list file, and the first update instruction is received from an authorized user;
   a second acceptance unit configured to accept a second update instruction to perform an update of a second firmware in which the plurality of update files and the content list file are put together in a single file and encrypted; and a second installation unit configured to, upon condition that the second update instruction is accepted by said second acceptance unit, download the second firmware in a single batch from the external apparatus and decrypt the second firmware, and install a plurality of files included in the decrypted second firmware in the image forming apparatus, wherein the first acceptance unit, the first installation unit, the second acceptance unit, and the second installation unit are implemented by the processor executing at least one program stored in the memory device.

2. An image forming apparatus that performs an update of a firmware comprising a plurality of update files and a content list file that shows a combination of the plurality of files, the image forming apparatus comprising:

a memory device;

a processor;

a first acceptance unit configured to accept a first update instruction to perform an update of a first firmware in which the plurality of files are respectively encrypted;

a first installation unit configured to, upon condition that the first update instruction is accepted by said first acceptance unit, download the content list file from an external apparatus, identify at least one difference update file to be installed in the image forming apparatus by comparing a list of files in the content list file and a list of files in the image forming apparatus, download the identified difference update file from the external apparatus and decrypt the difference update file, and install the difference update file in the image forming apparatus, wherein the difference update file includes at least one package file including at least one file, the package file does not include all files in the content list file, and the first update instruction is received from an authorized user;

a second acceptance unit configured to accept a second update instruction to perform an update of a second firmware in which the plurality of update files and the content list file are put together in a single file and encrypted; and a second installation unit configured to, upon condition that the second update instruction is accepted by said second acceptance unit, download the second firmware in a single batch from the external apparatus and decrypt the second firmware, identify a update file as an object of an update on a basis of the content list file included in the second firmware that is decrypted, and install only the update file in the image forming apparatus, wherein the first acceptance unit, the first installation unit, the second acceptance unit, and the second installation unit are implemented by the processor executing at least one program stored in the memory device.

3. The image forming apparatus according to claim 2, wherein the plurality of files included in the second firmware are encrypted; and said second installation unit is configured to identify a update file as an object of an update on a basis of the content list file included in the second firmware that is decrypted, and decrypt only an encrypted file corresponding to an identified update file and install the update file in the image forming apparatus.

4. The image forming apparatus according to claim 1, wherein said first acceptance unit is configured to accept only an instruction from the authorized user, the authorized user including a contracted user and a service person; and said second acceptance unit is configured to accept only an instruction from a general user.

5. The image forming apparatus according to claim 2, wherein said first acceptance unit is configured to accept only an instruction from the authorized user, the authorized user including a contracted user and a service person; and said second acceptance unit is configured to accept only an instruction from a general user.

6. A control method for an image forming apparatus that performs an update of a firmware comprising a plurality of files and a content list file that shows a combination of the plurality of files, the control method comprising:

a first acceptance step of accepting a first update instruction to perform an update of a first firmware in which the plurality of update files are respectively encrypted;

a first installation step of, upon condition that the first update instruction is accepted in said first acceptance step, downloading the content list file from an external apparatus, identifying at least one difference update file to be installed in the image forming apparatus by comparing a list of files in the content list file and a list of files in the image forming apparatus, downloading the identified difference update file from the external apparatus and decrypting the difference update file, and installing the difference update file in the image forming apparatus, wherein the difference update file includes at least one package file including at least one file, the package file does not include all files in the content list file, and the first update instruction is received from an authorized user;

a second acceptance step of accepting a second update instruction to perform an update of a second firmware in which the plurality of update files and the content list file are put together in a single file and encrypted; and a second installation step of, upon condition that the second update instruction is accepted in said second acceptance step, downloading the second firmware in a single batch from the external apparatus and decrypting the second firmware, and installing a plurality of files included in the decrypted second firmware in the image forming apparatus.

7. A control method for an image forming apparatus that performs an update of a firmware comprising a plurality of update files and a content list file that shows a combination of the plurality of files, the control method comprising:

a first acceptance step of accepting a first update instruction to perform an update of a first firmware in which the plurality of files are respectively encrypted;

a first installation step of, upon condition that the first update instruction is accepted in said first acceptance step, downloading the content list file from an external apparatus, identifying at least one difference update file to be installed in the image forming apparatus by comparing a list of files in the content list file and a list of files in the image forming apparatus, downloading the identified difference update file from the external apparatus and decrypting the difference update file, and installing the difference update file in the image forming apparatus, wherein the difference update file includes at least one package file including at least one file, the package file does not include all files in the content list file, and the first update instruction is received from an authorized user;

a second acceptance step of accepting a second update instruction to perform an update of a second firmware in which the plurality of update files and the content list file are put together in a single file and encrypted; and a second installation step of, upon condition that the second update instruction is accepted in said second acceptance step, downloading the second firmware in a single batch from the external apparatus and decrypting the second firmware, identifying a update file as an object of an update on a basis of the content list file included in the second firmware that is decrypted, and installing only the update file in the image forming apparatus.

8. A computer-readable, non-transitory storage medium storing a program for causing a computer of an image forming apparatus to implement a control method for the image forming apparatus, the image forming apparatus being that performs an update of a firmware comprising a plurality of update files and a content list file that shows a combination of the plurality of files, the control method comprising:

a first acceptance step of accepting a first update instruction to perform an update of a first firmware in which the plurality of files are respectively encrypted;

a first installation step of, upon condition that the first update instruction is accepted in said first acceptance step, downloading the content list file from an external apparatus, identifying at least one difference update file to be installed in the image forming apparatus by comparing a list of files in the content list file and a list of files in the image forming apparatus, downloading the identified difference update file from the external apparatus and decrypting the difference update file, and installing the difference update file in the image forming apparatus, wherein the difference update file includes at least one package file including at least one file, the package file does not include all files in the content list file, and the first update instruction is received from an authorized user;

a second acceptance step of accepting a second update instruction to perform an update of a second firmware in which the plurality of update files and the content list file are put together in a single file and encrypted; and a second installation step of, upon condition that the second update instruction is accepted in said second acceptance step, downloading the second firmware in a single batch from the external apparatus and decrypting the second firmware, and installing a plurality of files included in the decrypted second firmware in the image forming apparatus.

9. A computer-readable, non-transitory storage medium storing a program for causing a computer of an image forming apparatus to implement a control method for the image forming apparatus, the image forming apparatus being configured to perform an update of a firmware comprising a plurality of update files and a content list file that shows a combination of the plurality of files, the control method comprising:

a first acceptance step of accepting a first update instruction to perform an update of a first firmware in which the plurality of files are respectively encrypted;

a first installation step of, upon condition that the first update instruction is accepted in said first acceptance step, downloading the content list file from an external apparatus, identifying at least one difference update file to be installed in the image forming apparatus by comparing a list of files in the content list file and a list of files in the image forming apparatus, downloading the identified difference update file from the external apparatus and decrypting the difference update file, and installing the difference update file in the image forming apparatus, wherein the difference update file includes at least one package file including at least one file, the package file does not include all files in the content list file, and the first update instruction is received from an authorized user;

a second acceptance step of accepting a second update instruction to perform an update of a second firmware in which the plurality of update files and the content list file are put together in a single file and encrypted; and a second installation step of, upon condition that the second update instruction is accepted in said second acceptance step, downloading the second firmware in a single batch from the external apparatus and decrypting the second firmware, identifying an update file as an object of an update on a basis of the content list file included in the second firmware that is decrypted, and installing only the update file in the image forming apparatus.

* * * * *